United States Patent
Ma et al.

(10) Patent No.: US 9,453,276 B2
(45) Date of Patent: Sep. 27, 2016

(54) METHODS FOR APPLYING SACRIFICIAL COATINGS FOR CORROSION PROTECTION OF STEEL CHAINS AND CHAINS PREPARED THEREBY

(71) Applicant: Chevron U.S.A. Inc., San Ramon, CA (US)

(72) Inventors: Kai-tung Ma, Spring, TX (US); Devin Lee Witt, Houston, TX (US); Samuel Jay Mishael, Bellaire, TX (US); Adebayo Olakunle Akinpelu, Sugar Land, TX (US); Ariel Alexander Gonzalez, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 14/968,988

(22) Filed: Dec. 15, 2015

(65) Prior Publication Data

US 2016/0177433 A1 Jun. 23, 2016

Related U.S. Application Data

(60) Provisional application No. 62/093,813, filed on Dec. 18, 2014.

(51) Int. Cl.

| | |
|---|---|
| F16G 13/16 | (2006.01) |
| C23C 4/06 | (2016.01) |
| C23C 4/12 | (2016.01) |
| F16G 13/18 | (2006.01) |
| F16G 13/04 | (2006.01) |
| F16G 13/06 | (2006.01) |
| F16G 13/12 | (2006.01) |
| F16G 15/12 | (2006.01) |

(52) U.S. Cl.
CPC . *C23C 4/06* (2013.01); *C23C 4/12* (2013.01); *F16G 13/04* (2013.01); *F16G 13/06* (2013.01); *F16G 13/12* (2013.01); *F16G 13/16* (2013.01); *F16G 13/18* (2013.01); *F16G 15/12* (2013.01)

(58) Field of Classification Search
CPC ........ F16G 13/16; F16G 13/18; F16G 13/04; F16G 13/06; C23C 4/06; C23C 4/12
USPC .................................................. 59/78
See application file for complete search history.

(56) References Cited

U.S. PATENT DOCUMENTS

| | | | | |
|---|---|---|---|---|
| 3,136,664 | A * | 6/1964 | Kuntzmann | C23C 8/00 148/318 |
| 6,539,699 | B2 * | 4/2003 | Poiret | F16G 13/06 474/206 |
| 7,201,687 | B2 * | 4/2007 | Mott | F16G 13/04 156/215 |
| 7,490,715 | B2 * | 2/2009 | Girg | B21L 9/08 148/319 |
| 2003/0195074 | A1 * | 10/2003 | Kaga | F16G 13/04 474/213 |
| 2011/0281992 | A1 * | 11/2011 | Fukuike | B05D 7/16 524/440 |

* cited by examiner

*Primary Examiner* — David B Jones
(74) *Attorney, Agent, or Firm* — Karen R. DiDomenicis

(57) ABSTRACT

Processes for protecting steel chains from corrosion and steel chains thus protected are provided. The process includes using finite element analysis to determine stress levels within links of a steel chain having a plurality of connected links. Regions of each link of the chain corresponding to high stress levels are identified. Target areas corresponding to the regions identified are indicated for coating each link of the chain with a sacrificial coating. Thermally sprayed alumina can be used as the sacrificial coating.

9 Claims, 4 Drawing Sheets

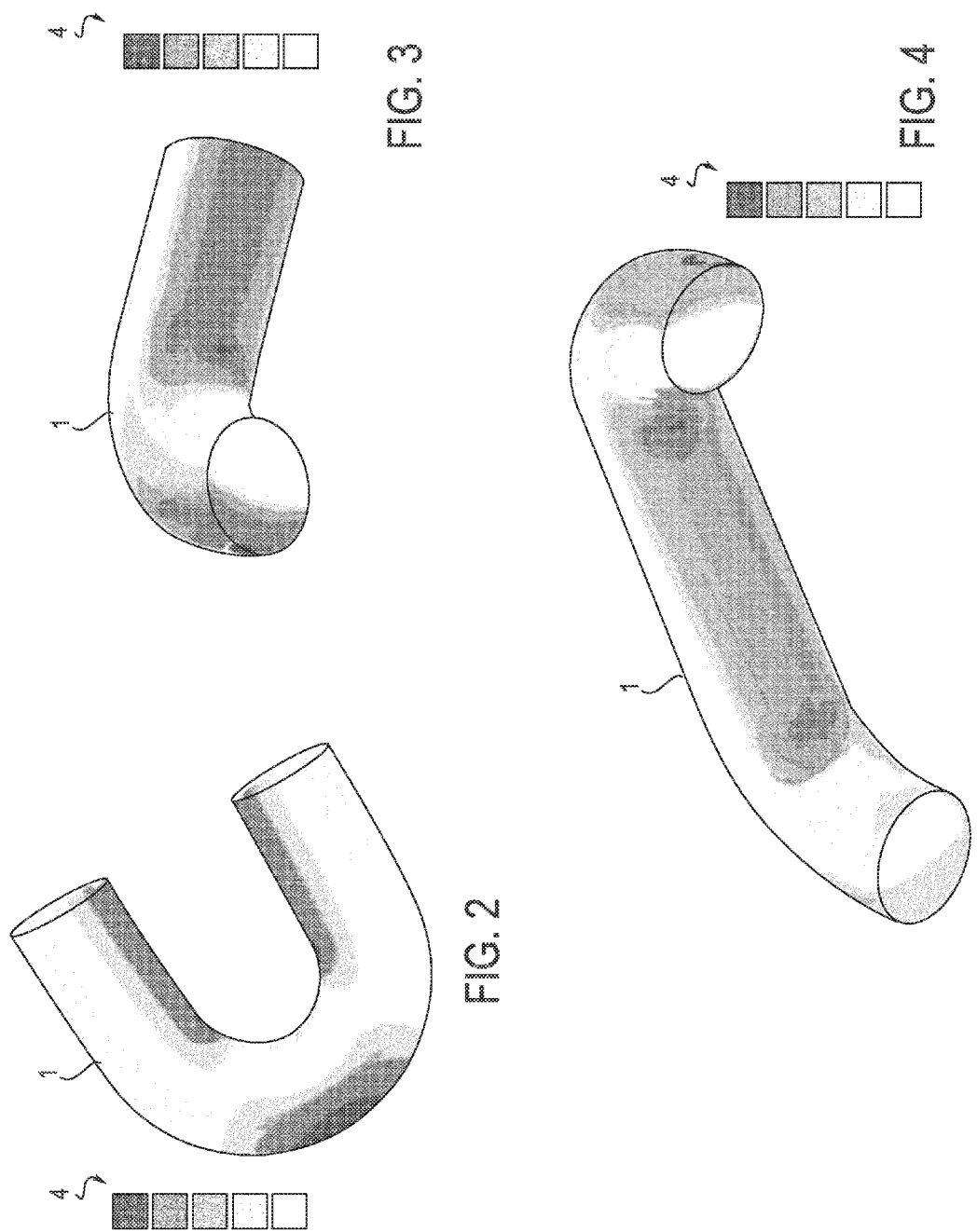

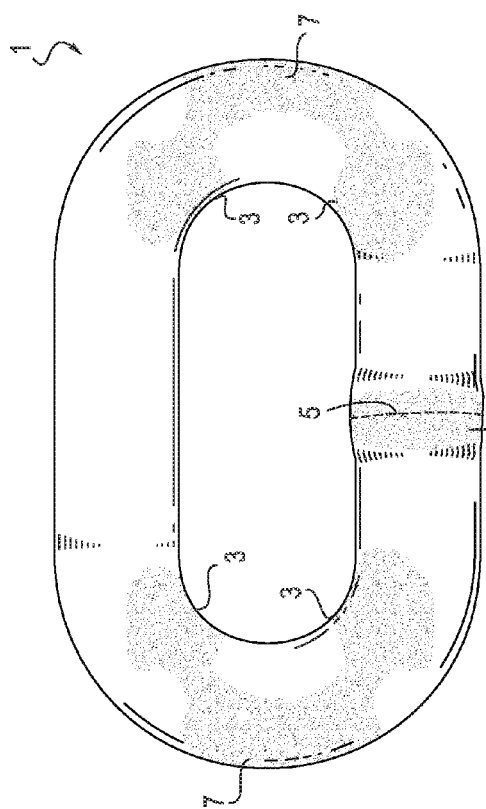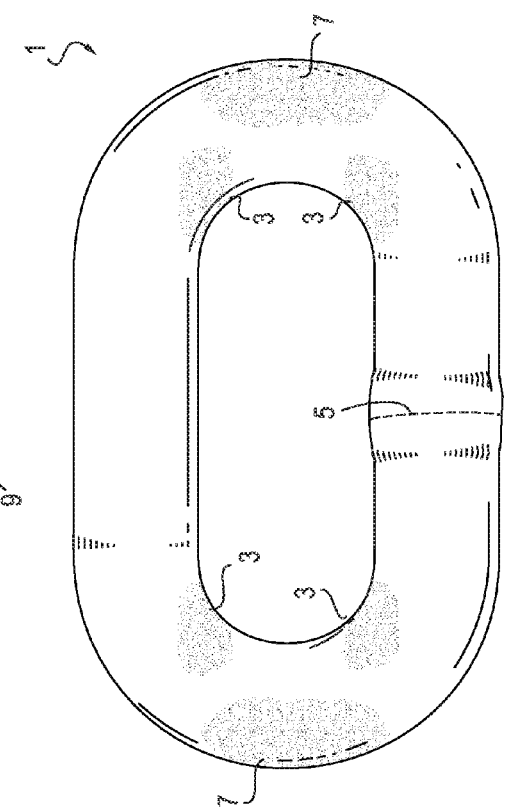

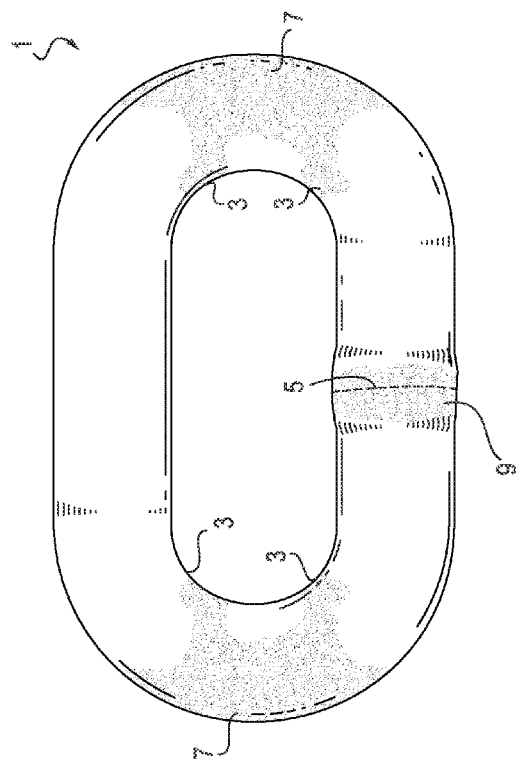
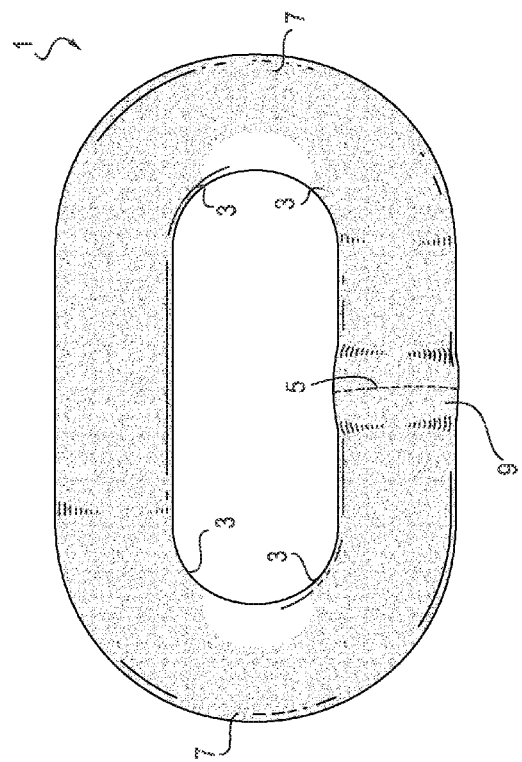

METHODS FOR APPLYING SACRIFICIAL COATINGS FOR CORROSION PROTECTION OF STEEL CHAINS AND CHAINS PREPARED THEREBY

FIELD

The present disclosure relates to methods for protecting steel chains having connecting steel links from corrosion by applying sacrificial coatings in a pattern as determined by engineering analysis. The present disclosure further relates to steel chains protected from corrosion having sacrificial coatings applied thereto.

BACKGROUND

Chains made of steel links can be susceptible to corrosion damage when exposed to a corrosive environment. It is widely known that mooring chains subjected to marine environments have multiple corrosion related problems. Such mooring chains are often replaced because of severe corrosion. This replacement is an expensive practice because of the lead time to procure new mooring chains as well as the difficult process in which old chains are replaced by new chain. Also, failure of the mooring chains from corrosion damage poses serious safety risk to the structures they moor.

One way that corrosion issues have been mitigated is by applying a coating such as thermally sprayed aluminum (TSA) to the surface of each link of the mooring chain. TSA sacrificially protects the steel substrate by acting as the anode in an electrochemical cell, while the steel becomes the cathode of the cell and is protected from corrosion. However, this process is costly, both in terms of the cost of the TSA coating and the difficulty in applying the coating. In order to apply the coating, slack must be introduced between the chain links so that the inter-grip areas of the links can be accessed and coated. Special handling is required in order to introduce the slack between the links, since each link can weigh up to 400 kg. This special handling requirement limits a mooring chain consumer to use chain manufacturers who have invested in the expensive handling equipment.

There exists a need for an economical solution to the after mentioned problems in methods for mitigating corrosion of heavy chains.

SUMMARY

In one aspect, a process for protecting a steel chain from corrosion is provided. The process includes using finite element analysis to determine stress levels within links of a steel chain having a plurality of connected links. Regions of each link of the chain corresponding to high stress levels are identified. Target areas corresponding to the regions identified are indicated for coating each link of the chain with a sacrificial coating.

In another aspect, a steel chain having a plurality of connected links as provided in which each link has a plurality of discrete areas on the surface coated with a sacrificial coating for protecting the steel chain from corrosion.

In yet another aspect, a process for protecting a steel chain from corrosion is provided. The steel chain has a plurality of connected links, wherein each link has a number of discrete areas including a crown at each end of the link, two interior shoulders at each end of the link, and a weld. A sacrificial coating is applied to any or all of these discrete areas.

DESCRIPTION OF THE DRAWINGS

These and other objects, features and advantages of the present invention will become better understood with reference to the following description, appended claims and accompanying drawings where:

FIGS. 2-4 are various views of a single link in a steel chain illustrating stress levels.

FIG. 5 is a side view of a link having a pattern of sacrificial coating thereon according to exemplary embodiment.

FIG. 6 is a side view of a link having a pattern of sacrificial coating thereon according to another exemplary embodiment.

FIG. 7 is a side view of a link having a pattern of sacrificial coating thereon according to another exemplary embodiment.

FIG. 8 is a side view of a link having a pattern of sacrificial coating thereon according to another exemplary embodiment.

DETAILED DESCRIPTION

Figure 1:
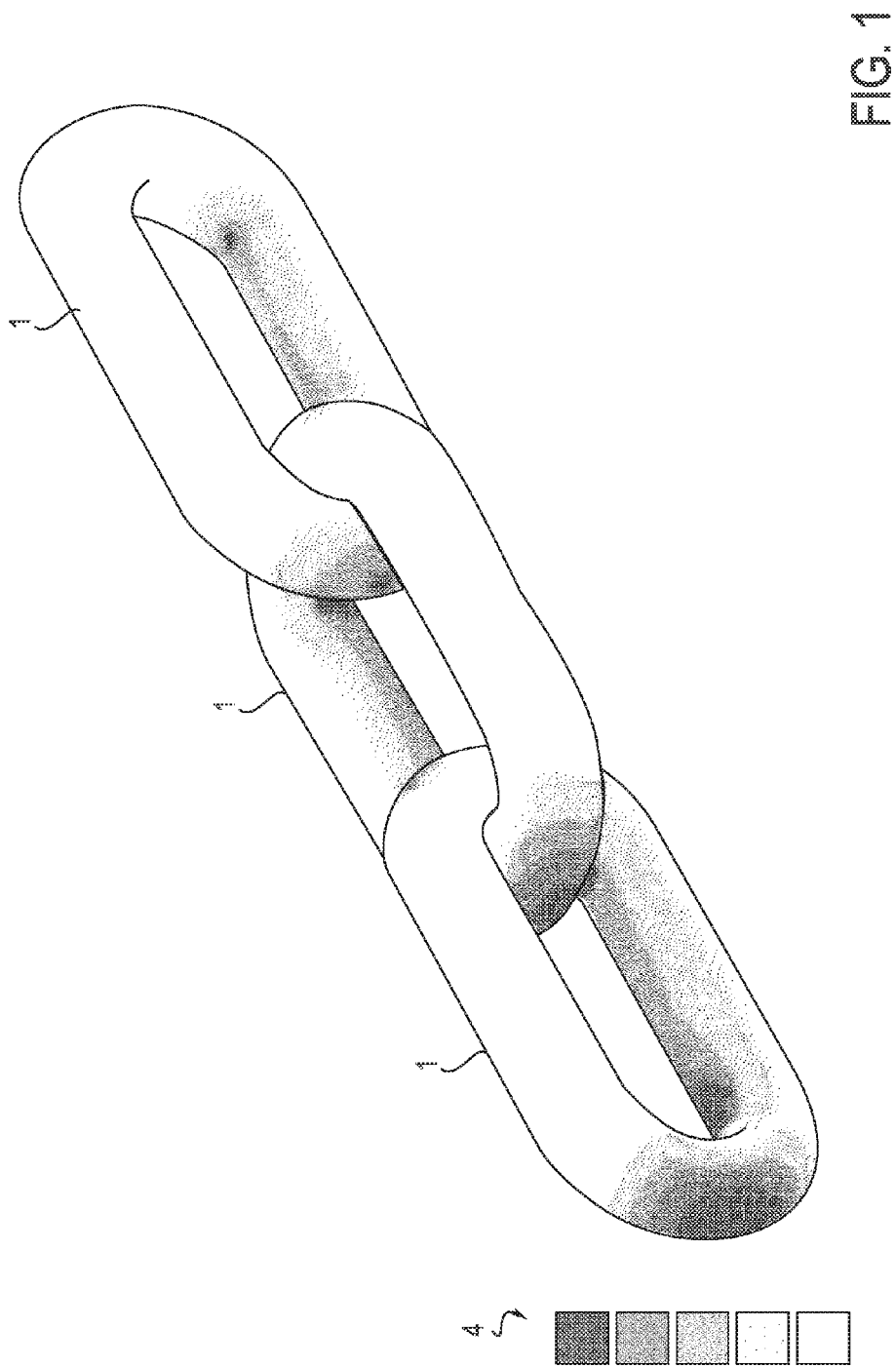
FIG. 1 is a perspective view of a steel chain illustrating stress levels in the steel chain.

In one embodiment, stress levels are determined within individual links of a steel chain having a series of connected links. The steel chain can be made of carbon steel or low alloy steel. The links can be generally torus or oval shaped as is well known. Such chains are manufactured by a process in which each link is welded into a closed loop, and thereby connecting it to the previous link.

High tensile stresses are present within each link while under normal loading conditions. Cyclic loading of a mooring chain while under normal conditions (i.e., waves, wind, storms, and the like) can lead to fatigue in key high stressed regions which would become even more susceptible to corrosion related failures. Stress levels within each link can be determined by finite element analysis. Regions of each link of the chain corresponding to relatively high stress levels can be identified. For instance, FIG. 1 is a view of a steel chain made of a series of connecting links 1 illustrating the stress levels in the steel chain as determined by finite element analysis. As indicated in the legend 4, darker shading indicates higher stress levels. FIG. 2 is a view of a single link 1 bisected along the width of the link, i.e., the narrower of the two major dimensions of the link. FIG. 3 is a view of the half link of FIG. 2, again bisected. FIG. 4 is a view of a single link 1 bisected along the length of the link. FIGS. 2-4 illustrate the stress levels as determined by finite element analysis.

In one embodiment, regions within one or more links of a chain having been identified as including high stresses are indicated as target areas for coating with a sacrificial coating, also referred to as a sacrificial metal coating. The target areas for coating can be indicated in any number of suitable ways. For instance, in one embodiment, a visual guide can be provided to operators indicating where the operator should apply the coating on each link. In another embodiment, the target areas for coating can be visually indicated directly on the links as a guide for the operators.

By sacrificial coating or sacrificial metal coating is meant a coating which provides sacrificial protection against corrosion, i.e., one in which the coating acts as a sacrificial metal, or as an anode, on the surface of the steel be protected. The sacrificial coatings also serve as a physical barrier which helps to protect the underlying steel from corroding. Such coatings include coatings applied by thermal spraying in which hot or molten material is sprayed onto the target areas. Thermal spraying generally uses combustion or electrical arc discharge to heat material feedstock in the form of powder, wire, liquid, etc. Hot particles are heated and accelerated by a thermal spray gun towards the target surface. Any known thermal spraying technique can be used, including, but not limited to, plasma spraying, detonation spraying, wire arc spraying, flame spraying, high velocity oxy-fuel coating spraying, warm spraying and cold spraying.

The sacrificial coating can be a composition selected from metals, alloys, ceramics, thermoplastic polymers, composites and combinations thereof. In one embodiment, the sacrificial coating includes a metal selected from aluminum, zinc, magnesium and alloys thereof.

In one embodiment, the sacrificial coating is applied to the links of a chain during a process of quality inspection of the chain following the manufacture of the chain.

The sacrificial coating is applied to each link in a predetermined pattern. In one embodiment, the target areas for coating each link of the chain correspond to the regions identified as having high stress levels. Each link includes a crown at each end of the link, two interior shoulders at each end of the link and a weld. In one embodiment, the target areas for coating each link in a chain can be selected from each crown of the link, each interior shoulder of the link, the weld of the link and combinations thereof.

FIG. 5 is a side view of a single link 1 having a pattern of sacrificial coating thereon, indicated by shading, according to one embodiment. The link 1 includes a crown 7 at each end of the link, two interior shoulders 3 at each end of the link and a weld 5. As can be seen, each of these areas is coated. In one embodiment, as shown in FIG. 6, the pattern of coating is different in that coating of the interior shoulders 3 and the crowns 7 are not in contact with one another, and the weld 5 is left uncoated. FIG. 7 shows yet another pattern of coating, in which the weld 5 is coated. As shown in FIG. 8, in one embodiment, the link 1 is coated with the exception of the intergrip areas at each end. Many other patterns not illustrated are contemplated by the invention.

One of the advantages of the present disclosure is that the sacrificial coating is not applied to the intergrip area of each link. By not coating the intergrip area, the coating process is greatly simplified. Strenuous handling of heavy chain can be avoided; therefore labor cost can be reduced and process safety can be improved. Finite element analysis has shown that stresses at the intergrip area are not critical. As a result, allowing this area to corrode has been found to be acceptable while still providing long life of the chain.

Finite element analysis has been used to show that stresses at other areas of each link are higher and therefore by protecting such areas, the life of the steel chain can be extended. Certain areas in particular have the highest stresses, and therefore are identified as the most critical areas to be protected.

In one embodiment, the sacrificial coating can cover from as little as 5% to as much as 95% of the surface area of each link. In one embodiment, the sacrificial coating covers from 10% to 90% of the surface area of each link. It is preferred to coat as much surface area as possible for a mooring system designed for long term service, e.g. 20 years. For mooring systems that are designed for shorter surface, such as approximately 5 years, only the portions of the chain-link with the highest stresses can be coated.

In one embodiment, the thickness of the sacrificial coating on each link can be from 0.10 mm to 1.0 mm, even from 0.15 mm to 0.30 mm.

In one embodiment, a method is provided for determining the area and the thickness over which TSA is applied. First, an anode mass required for sacrificial protection is determined. A surface area factor can be included in this calculation to account for the application of a sealer coating over the TSA coating. The TSA coating can be porous, and the interconnected porosities can extend from the exterior of the coating to the steel surface below the coating. Depending on the thickness of the TSA coating, there may be a capillary effect, so that it can be assumed that the total mooring chain surface area is essentially exposed to seawater. In one embodiment, a sealer coating can be used to effectively seal the porosity. The sealer can be a thin coating that is absorbed into the pores of the TSA extending the life of the TSA coating by effectively reducing the total surface area in contact with seawater. The sealer can also protect against the occurrence of blistering, especially in the splash zone region. A sealer coat can reduce total exposed surface area by at least 90%. In one embodiment, if a sealer coat is used, it can be assumed that only 10% of TSA coated steel surface is in contact with seawater. If no sealer coat is used, it can be assumed that all of the steel surface is exposed to seawater. The current density is multiplied by the surface area factor to get the actual current density required. The current density will depend on factors including the geographic region, water depth and temperature.

EXAMPLES

Example 1

The anode mass required for sacrificial protection of a steel mooring chain was determined for a hypothetical carbon steel mooring chain. The following assumptions were made.

A mean design current density $i_{cp}$ of 0.1 A/m² was selected from DNV RP B401 Table 10-2 as required to protect bare carbon steel in seawater.

A design electrochemical capacity C of 2000 A-hr/kg for aluminum-based alloys in seawater was assumed, as taken from DNV RP B401 Table 10-6.

A sealer coat was assumed, thus 10% of TSA coated steel surface was assumed to be in contact with seawater, and the surface area factor 'a' was estimated to be 0.1.

The current density $i_{cp}$ was multiplied by the surface area factor 'a' to get the actual current density required. A utilization/efficiency factor u of 0.8 was included to account for the fact that the TSA could stop contributing adequate protective current after 80% of its mass has been consumed, as taken from DNV RP B401 Table10-8. The anode electrochemical capacity C was multiplied by the utilization factor u to get the actual anode capacity.

Mass required in kg/m²-yr was calculated as (note: 1 year=8760 hr):

$M_{req}$ per year=Actual current density required/Actual anode capacity=$[(a \times i_{cp})/(u \times C)] \times 8760$=0.055 kg/m²-yr To calculate the total mass of TSA required, this value is multiplied by the total exposed surface area of the mooring chain and the required design life.

The maximum mass of TSA that can be deposited was determined for the hypothetical carbon steel mooring chain. The TSA coating thickness t required to prevent corrosion was assumed to be 375 μm, based on the maximum thickness that has been typically applied for corrosion protection. The density of the TSA coating with 99.5% Aluminum was assumed to be 2600 kg/m³ per the U.S. Army Corps of Engineers (USACE) Engineer Manual. It is assumed that 10% of the chain surface area is covered by TSA coating. The mass of the TSA deposited was calculated as:

$M_{deposit} = p \times t \times A_c = 0.10$ kg/m²

The life (in years) of the TSA coating was calculated as:

$L = M_{deposit}/M_{req}$ per year=1.8 years

Examples 2-4

Changes in the assumptions were made as indicated in the Table. Calculated values for $M_{req}$, $M_{deposit}$ and L are given in the Table.

TABLE

|  | Example 1 | Example 2 | Example 3 | Example 4 |
|---|---|---|---|---|
| Mean current density required, $i_{cp}$ (A/m²) | 0.1 | 0.1 | 0.1 | 0.1 |
| Design electrochemical capacity, C (A-hr/kg) | 2000 | 2000 | 2000 | 2000 |
| Surface area factor, a | 0.1 | 0.05 | 0.1 | 0.05 |
| Utilization/efficiency factor, u | 0.8 | 0.8 | 0.8 | 0.8 |
| Anode mass required, $M_{req}$ (kg/m²-yr) | 0.055 | 0.027 | 0.055 | 0.027 |
| TSA coating thickness, t (μm) | 375 | 375 | 375 | 375 |
| TSA density, ρ (kg/m³) | 2600 | 2600 | 2600 | 2600 |
| TSA coverage, $A_c$ (%) | 10 | 10 | 90 | 90 |
| Max. anode mass deposited, $M_{deposit}$ (kg/m²) | 0.10 | 0.10 | 0.88 | 0.88 |
| Expected life of TSA, L (years) | 1.8 | 3.6 | 16.0 | 32.0 |

It should be noted that only the components relevant to the disclosure are shown in the figures, and that many other components normally part of a system for manufacturing a steel chain or for thermally spraying a sacrificial coating are not shown for simplicity.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A process for protecting a steel chain from corrosion, comprising:
   a. using finite element analysis to determine stress levels within links of a steel chain comprising a plurality of connected links;
   b. identifying regions of each link of the chain corresponding to high stress levels;
   c. indicating target areas for coating each link of the chain corresponding to the regions identified; and
   d. applying a sacrificial coating to the target areas;
      wherein each link comprises a crown at each end of the link, two interior shoulders at each end of the link and a weld; and wherein the target areas for coating each link of the chain corresponding to the regions identified comprise areas of the link selected from the group consisting of each crown of the link, each interior shoulder of the link, the weld of the link and combinations thereof.

2. The process of claim 1, wherein the sacrificial coating comprises a metal selected from the group consisting of aluminum, zinc, magnesium and alloys thereof.

3. The process of claim 1, wherein the sacrificial coating is applied by thermal spraying.

4. The process of claim 1, wherein the sacrificial coating is applied during a process for inspection of the steel chain.

5. The process of claim 1, wherein the sacrificial coating on each link covers from 5% to 95% of the surface area of the link.

6. The process of claim 1, wherein the sacrificial coating on each link has a thickness from 0.10 to 1.0 mm.

7. The process of claim 1, wherein the sacrificial coating on each link has a thickness from 0.15 to 0.30 mm.

8. The process of claim 1, wherein the sacrificial coating comprises a composition selected from the group consisting of metals, alloys, ceramics, thermoplastic polymers, composites and combinations thereof.

9. The process of claim 1, wherein the links of steel chain comprise carbon steel.

* * * * *